Sept. 30, 1924.
J. F. O'CONNOR
FRICTION SHOCK ABSORBING MECHANISM
Filed Sept. 16, 1922
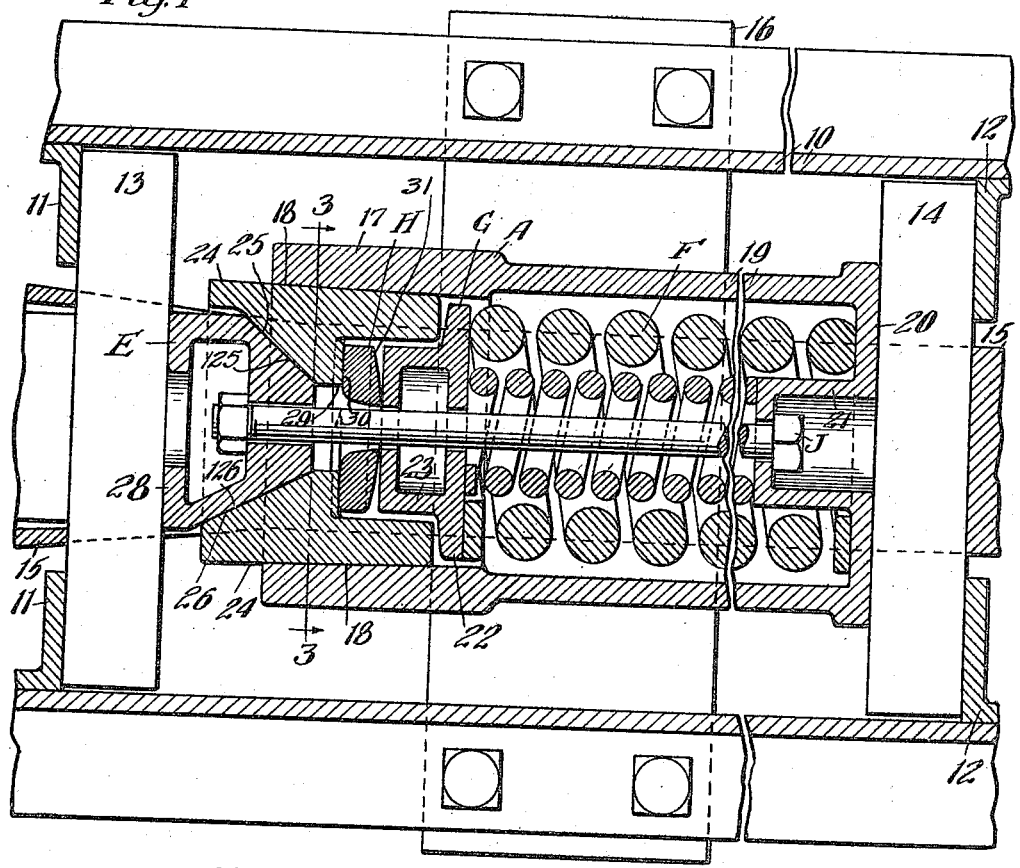
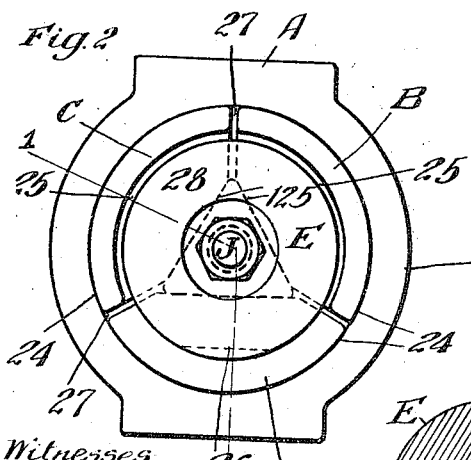
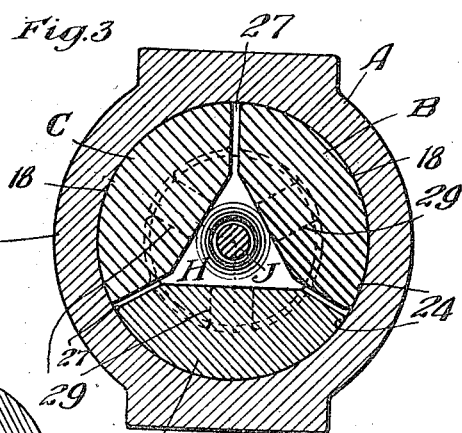
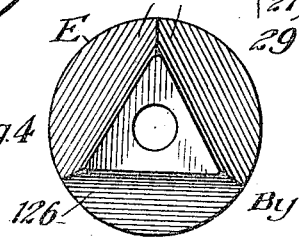
Inventor
John F. O'Connor Patented Sept. 30, 1924.

1,510,335

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 16, 1922. Serial No. 588,573.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism for railway draft riggings wherein are obtained high frictional capacity, and certain release, the arrangement being such that the frictional capacity is developed during compression by means of a relatively keen angle wedge system and the release is insured by a relatively blunt releasing angle system.

Another object of the invention is to provide a mechanism of the character above indicated wherein is employed a friction shell of generally cylindrical form with wedge-friction-shoes arranged therein in a circular series.

A specific object of the invention is to provide in a mechanism of the character indicated, means which are automatically operable to insure balanced spring resistance to all of the friction shoes, regardless of any unequal travel of the shoes inwardly of the shell during a compression stroke.

In the drawing forming a part of this specification, Figure 1 is a horizontal longitudinal sectional view, parts broken away, of a portion of a railway draft rigging, the section through the shell and friction elements therewithin being taken on the line 1—1 of Figure 2 and corresponding to two section planes at 120° apart. Figure 2 is a front end elevation of the shock absorbing mechanism proper shown in Figure 1. And Figure 3 is a vertical transverse sectional view corresponding to the section line 3—3 of Figure 1. And Figure 4 is an end view of the wedge.

In said drawing, 10—10 denote the usual channel draft sills of a car underframe, to the inner faces of which are secured front stop lugs 11 and rear stop lugs 12. The improved shock absorbing mechanism proper, a front follower 13 and a rear follower 14 are disposed within a hooded cast yoke 15 by which the mechanism is operatively associated with the drawbar. The yoke and parts therewithin are held in operative position by a detachable saddle plate 16.

The improved shock absorbing mechanism proper, as shown, comprises a combined friction shell and spring cage casting A; three friction shoes B, C and D; a pressure-transmitting wedge E; a spring resistance F; a spring follower G; a balancing spring cap or plate H; and a retainer bolt J.

The casting A is provided with a friction shell or cylinder proper at its outer or front end, the same being indicated at 17 and of generally cylindrical form. In actual practice, said shell 17 will preferably be provided with three true cylindrical surfaces 18 which are converged inwardly of the shell, that is, while the interior of the shell 17 is tapered, it is not of cone formation but on the contrary consists of three sections of cylindrical surfaces in order that the cylindrical surfaces of the shoes, hereinafter described, will always maintain full surface contact with the friction surfaces of the shell, as distinguished from line contact. Rearwardly of the shell proper 17, the casting A is formed with a cylindrical spring cage section indicated at 19, the latter having an integral rear wall 20 which bears upon the rear follower 14.

The spring F preferably consists of an outer heavy coil and an inner nested lighter coil, the former bearing upon the wall 20 and the latter upon an inwardly extended hollow boss 21. The latter provides an anchoring means for one end of the retainer bolt J, the other end of which is anchored to the wedge E, as clearly shown in Figure 1.

At their forward ends, the two coils of the spring F bear on the inner side of the spring follower G, the latter having an annular flange 22 which is spaced from the inner ends of the friction shoes and, forwardly of the flange 22, the follower G is provided with a hollow block 23.

The three friction shoes B, C and D are arranged in a circular series, each having an outer cylindrical friction surface 24 which cooperates with one of the cylindrical friction surfaces 18 of the shell. In the instance shown, the two shoes B and C are of like construction and each is provided on its inner side with a face 25 which is inclined rearwardly and toward the axis of the mechanism at a relatively blunt angle. The other shoe D is provided on its inner side with a face 26 which is inclined rearwardly and toward the axis of the mechanism at a relatively acute and true wedging angle with respect to forces applied parallel or substantially parallel to the axis of the mechanism. It will thus be observed that the arrangement of the three shoes B, C and D is such that one of them, the shoe D, is adapted to act with a true wedging action which is opposed to the two blunt angle inclined faces 25 of the other shoes B and C. In actual practice, the inclination of the faces 25 will be made such that there will be no substantial or appreciable slippage or wedging action thereon during a compression stroke but on account of the opposed relation of the face 26 to the other two faces 25, it is obvious that any radial pressure created upon the face 26 due to the wedging action, will induce a corresponding equal reaction on the two faces 25—25. By reference to Figures 2 and 3, it will be noted that ample clearance is left between the longitudinal edges of the shoes as indicated at 27 to allow for their relative approach toward the center of the mechanism as they travel down the inclined shell friction surfaces 18.

The wedge E, in the instance shown, comprises a single block preferably in the form of a casting and has an outer flat bearing surface 28 engaging one side of the front follower 13. Said wedge E is also provided with three rearwardly and inwardly inclined surfaces, one, indicated at 126, corresponding in slope to and cooperable with the face 26 of the shoe D, and two others, indicated at 125—125, which correspond in slope to and cooperate with the inclined faces 25 of the other two shoes B and C.

Each of the shoes B, C and D, on the inner side of the enlargement thereof which is provided in order to obtain the inclined surfaces 25 and 26, is formed with a radially extending rib 29, said ribs 29 having cylindrical surfaces as indicated at 30 in Figure 1. Said cylindrical surfaces 30, arranged equidistant around the axis of the mechanism, as shown in Figure 3, bear upon the front side of the spring cap H, as best shown in Figure 1. The front side of said spring cap H is flat so as to insure a line bearing with the radial ribs 29. The rear side of the spring cap H is made spherical as indicated at 31 so as to adapt it to rock or balance itself in every direction on the flat front face of the section 23 of the spring follower G.

During a compression stroke, the true wedging action will take place on the cooperating set of faces 26 and 126 and as the friction unit comprised of the three shoes and the wedge travels inwardly of the shell, there will be some differential action induced on account of the taper of the shell surfaces 18. Due to the difference in the angles of the set of faces 26—126 on the one hand and the other sets of faces 25 and 125 on the other hand, there is a tendency of the two shoes B and C to travel in unison with the wedge E in advance of the shoe D and this tendency is further accelerated by reason of the taper of the shell surfaces 18, inasmuch as it is more difficult for the friction shoe D to slip inwardly on the wedge E when the pressure is being applied to the wedge E, than it is for the shoes B and C to slip radially inwardly of and longitudinally in advance of the wedge E. It therefore becomes advisable to insure a balanced spring resistance to all three of the shoes B, C and D and this I obtain by reason of the equalizing spring cap H and the cylindrical ribs 29 on the shoes, inasmuch as it is apparent that, should the two shoes B and C advance longitudinally ahead of the shoe D, the spring cap H may rock or adjust itself on the spring follower G and still maintain line contact between the cap H and each of the shoes and a theoretical point contact between the cap H and the follower G. Upon discontinuance of the actuating force, the initiation of the release will take place on the two sets of blunt faces 25 and 125, all in a manner similar to that set forth in my prior pending application Serial No. 289,800 for Improvement in Friction Shock Absorbing Mechanism, filed June 18, 1920 and to which reference may be had for a more specific explanation of the operation.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a friction shell having interior friction surfaces arranged circularly; of a series of friction shoes within and cooperable with said shell and arranged in a circular series; a spring resistance; spreader means cooperable with said shoes, said shoes and spreader means having a plurality of cooperating sets of faces, part of which are arranged at a relatively keen wedge-acting angle and others at a relatively blunt releasing angle; and automatically operable pressure-equalizing means interposed between said spring resistance and all of said shoes.

2. In a friction shock absorbing mechanism, the combination with a friction shell having interior friction surfaces arranged circularly; of a series of friction shoes within and co-operable with said shell and arranged in a circular series; a spring resistance; spreader means cooperable with said shoes, said shoes and spreader means having a plurality of cooperating sets of faces, part of which are arranged at a relatively keen wedge-acting angle and others at a relatively blunt releasing angle, said spreader means comprising a single pressure-transmitting block; and automatically operable pressure-equalizing means interposed between said spring resistance and all of the shoes.

3. In a friction shock absorbing mechanism, the combination with a cylindrical friction shell having interior friction surfaces of cylindrical form; of a spring resistance; a plurality of friction shoes operating within the shell and arranged in a circular series therewithin; a shock-transmitting wedge operating between said shoes, one of said shoes having a wedge face at an angle which is acute and of high friction-creating capacity and non-releasing, another friction shoe in opposed relation having a face engaged by said wedge at a wedge-releasing angle; and automatically operable pressure-equalizing means interposed between said spring resistance and all of said shoes.

4. In a friction shock absorbing mechanism, the combination with a friction shell having interior friction surfaces converged inwardly of the shell, said surfaces being each of cylindrical form; of a spring resistance; a series of friction shoes corresponding in number to the number of said shell friction surfaces, each of said friction shoes having an outer cylindrical friction surface cooperable with the shell friction surface; a shock-transmitting wedge operating between said shoes, one of said shoes having a wedge face at an angle which is acute and of high friction-creating capacity, and another shoe in opposed relation with respect to said acute angle shoe, having a face engaged by said wedge at a releasing angle; and automatically operable pressure-equalizing means interposed between said spring resistance and all of said shoe.

5. In a friction shock absorbing mechanism, the combination with a friction shell having interior friction surfaces converged inwardly of the shell, said surfaces being each of cylindrical form; of a spring resistance; a series of friction shoes corresponding in number to the number of said shell friction surfaces, each of said friction shoes having an outer cylindrical friction surface cooperable with a shell friction surface; a shock-transmitting wedge operating between said shoes, one of said shoes having a wedge face at an angle which is acute and of high friction-creating capacity, and another shoe in opposed relation with respect to said acute angle shoe, having a face engaged by said wedge at a releasing angle; and automatically operable pressure-equalizing means interposed between said spring resistance and all of said shoes, said means including a spring follower and a spring cap between the follower and the shoes, the cap having a spherical bearing surface on one side thereof.

6. In a friction shock absorbing mechanism, the combination with a friction shell having interior friction surfaces converged inwardly of the shell, said surfaces being each of cylindrical form; of a spring resistance; a series of friction shoes corresponding in number to the number of said shell friction surfaces, each of said friction shoes having an outer cylindrical friction surface cooperable with a shell friction surface; a shock-transmitting wedge operating between said shoes, one of said shoes having a wedge face at an angle which is acute and of high friction-creating capacity, and another shoe in opposed relation with respect to said acute angle shoe, having a face engaged by said wedge at a releasing angle; and automatically operable pressure-equalizing means interposed between said spring resistance and all of said shoes, said means comprising a spring follower, a spring cap having a spherical surface bearing on said follower on the side of the latter adjacent the shoes, and radially extending cylindrical ribs on the friction shoes engageable with the opposite side of said spring cap.

In witness that I claim the foregoing I have hereunto subscribed my name this 17th day of August, 1922.

JOHN F. O'CONNOR.

Witnesses:
UNA C. GRIGSBY,
ANN BAKER.